Feb. 6, 1945. R. A. BRADEN 2,369,011
MONITORING AND MEASURING APPARATUS FOR
FREQUENCY MODULATED SIGNALS
Filed Feb. 27, 1942
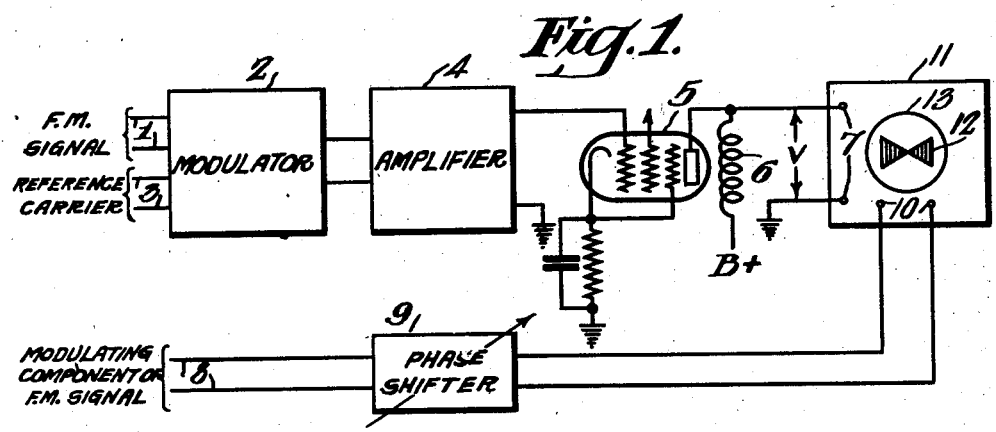
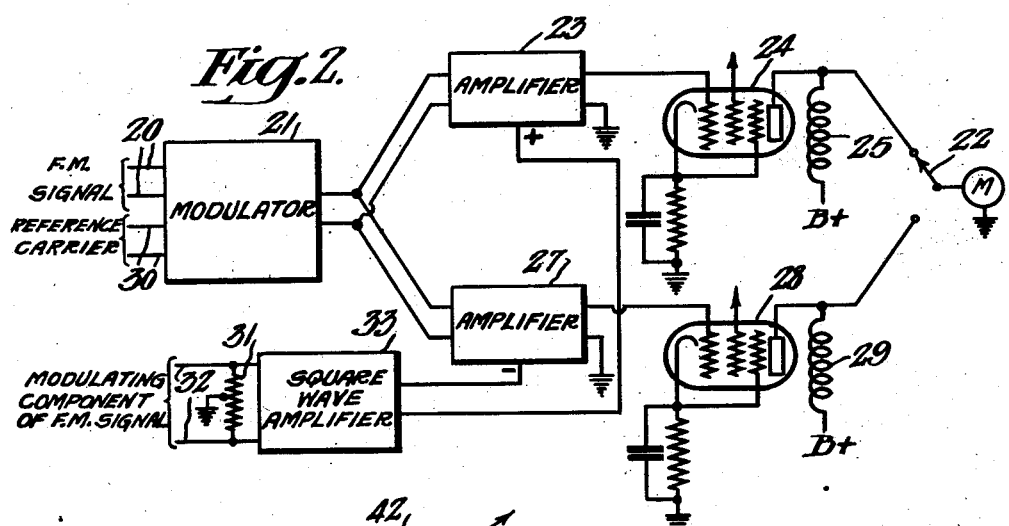
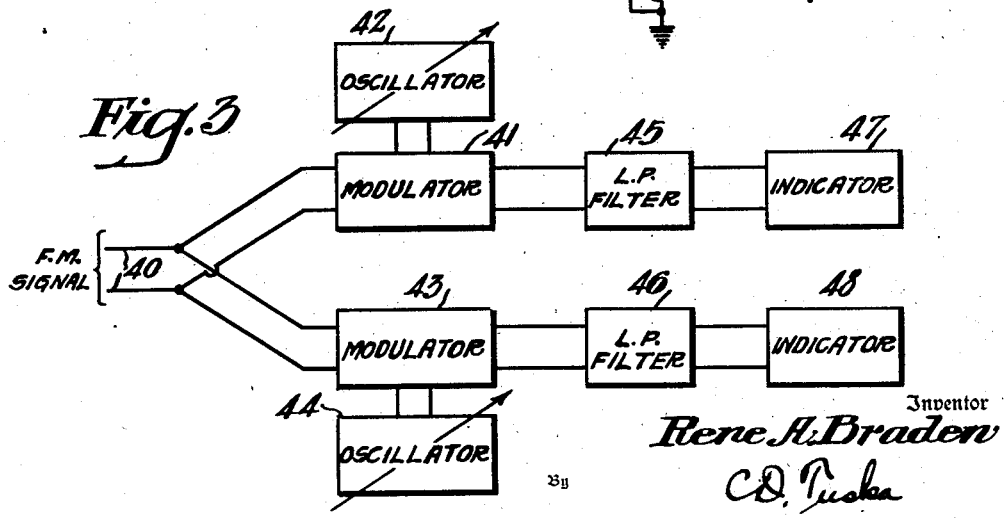
Inventor
Rene A. Braden
By C. D. Tuska
Attorney Patented Feb. 6, 1945

2,369,011

UNITED STATES PATENT OFFICE 2,369,011

MONITORING AND MEASURING APPARATUS FOR FREQUENCY MODULATED SIGNALS

Rene A. Braden, Haddon Heights, N. J., assignor to Radio Corporation of America, a corporation of Delaware Application February 27, 1942, Serial No. 432,632

4 Claims. (Cl. 179—171.5)

This invention relates generally to electrical measuring apparatus, and particularly to monitoring and measuring apparatus for frequency modulated signals in which observation of the peak frequency swing of such signals is of interest.

Heretofore various methods and apparatus for measuring the peak frequency swing of frequency modulated signals have been used, but all have involved the use of complicated and carefully adjusted circuits for selecting the particular frequency bands required for observation and for providing suitable indications of the instantaneous frequency values of the signals.

It is an object of this invention to provide a method and apparatus for utilizing conventional means for deriving the instantaneous frequency deviation of the frequency modulated signals with reference to a mean or reference carrier frequency source, combined with a new and simple method and apparatus for indicating the value or degree of this instantaneous frequency deviation. It is another object of the invention to provide a method and apparatus for amplitude modulating the frequency modulated signal with a reference carrier frequency to derive a beat frequency corresponding to the mean deviation between the frequency modulated signal and the reference frequency, in which the beat frequency is applied to a measuring instrument as a function of the modulating component of the frequency modulated signals. It is an additional object of the invention to provide a method and apparatus for selecting frequency limits and indicating overmodulation, with respect to such limits, in a frequency modulated signal.

The invention will be described by reference to the drawing in which Figure 1 is a schematic circuit diagram of one embodiment of the invention; Figure 2 is a schematic circuit diagram of another embodiment of the invention, and Figure 3 is a schematic block circuit diagram of still another embodiment of the invention.

Referring to Figure 1 of the drawing, a source of frequency modulated signals is connected to the input circuit 1 of a modulator 2. A source of reference carrier frequency, preferably the mean carrier fequency of the frequency modulated signals, is connected to the input circuit 3 of the modulator 2. The output of modulator 2 is connected through the amplifier 4 to the control electrode of a pentode type electron discharge tube 5 having high anode resistance. A relatively high inductance 6 is included in the anode circuit of the tube 5. The voltage developed across the anode circuit of tube 5 is applied to the vertical deflecting element 7 of a cathode ray oscillograph tube 13. Since the anode load of tube 5 is a substantially pure inductance the voltage developed across the anode circuit will be directly proportional to the frequency applied to the control electrode. Therefore, the vertical deflection of the cathode ray of the oscilloscope 13 will be directly proportional to frequency. A source of signals corresponding to the modulating component of the frequency modulated signal under observation is connected to the terminals 8 of a variable phase shifter 9. The output of the phase shifting circuit is connected to the horizontal deflecting elements 10 of the cathode ray oscillograph 13. This horizontal deflecting signal provides a timing voltage which permits the instantaneous frequency deviation of the frequency modulated signal to be observed. The signals corresponding to the modulating component of the frequency modulated signal may be derived either directly from the frequency modulated signal input circuit or they may be derived from the transmitted signal under observation by means of a conventional frequency modulation receiver.

Referring to Figure 2 of the drawing, a frequency modulated signal to be observed is applied to the terminals 20 of a modulator 21. A reference carrier frequency, preferably corresponding to the mean carrier frequency of the frequency modulated signals is applied to the terminals 30 of the modulator circuit 21. The output of the modulator circuit 21 is connected to the input of a first variable gain amplifier 23 and is also connected to the input of a second variable gain amplifier 27. The output of the first amplifier 23 is connected to the control electrode of a pentode thermionic tube 24 having high anode resistance. A substantially pure inductive load 25 is connected in the anode circuit of tube 24. The output of the second amplifier 27 is connected to the control electrode of a pentode thermionic tube 28 having high anode resistance. A substantially pure inductive load 29 is connected in the anode circuit of the tube 28. Switching means 22 are provided for connecting a peak reading voltmeter M across the anode circuits of either of the tubes 24 or 28, as desired. Grid bias for the variable gain amplifiers 23 and 27 is obtained from a square wave limiter-amplifier 33 which is actuated through a balanced circuit 31 by signals corresponding to the modulating component of the frequency modulated signals under observation. This modulating component can be obtained directly from the modulation input circuit of the frequency modulated signal source, or by means of a conventional frequency modulation receiver actuated by the frequency modulated signals. The output of the square wave amplifier is used to trigger the variable gain amplifier 23 on positive square wave pulses and the variable gain amplifier 27 on negative square wave pulses. Since the duration of the square wave pulses is considerably greater than the duration of the frequency swing of the frequency modulated signal, no phase shifting network is required for satisfactory timing. The amplifier 23 will conduct during periods of positive frequency deviation, and the degree of deviation will be indicated by the voltage, proportional to frequency, developed across the inductive load 25, as previously explained. The amplifier 27 will become conducting on negative frequency deviation and the degree of deviation will be indicated by the voltage proportional to frequency developed across the inductive load 29.

Figure 3 of the drawing provides a method and circuit for indicating over-modulation. A source of frequency modulated signals under observation is connected to the terminals 40 which are connected to the input circuits of modulators 41 and 43. A variable frequency oscillator 42 is connected to the input of the modulator 41 and a second variable frequency oscillator 44 is connected to the input of the modulator 43. The frequency of the oscillator 42 is adjusted slightly above the desired maximum frequency limit of the frequency modulated signal. The frequency of the oscillator 44 is adjusted slightly below the minimum desired frequency limit of the frequency modulated signal. The output of the modulator 41 is connected through a conventional low pass filter 45 to an indicator 47. The output of the modulator 43 is connected through a low-pass filter 46 to an indicator 48. It will be apparent that if the frequency modulated signal under observation swings to or through values which produce beat frequency currents in the output of the modulators which will be passed by the low-pass filters, either one or the other of the indicators will be actuated. It will be apparent that the frequency of oscillators 42 and 44 can be adjusted to indicate overmodulation in either symmetrical or unsymmetrical frequency modulated signals.

It will be understood that the circuit components illustrated in the drawing by block diagram, and not described in detail, are of conventional types well known to those skilled in the art.

I claim as my invention:

1. Apparatus for observing the peak frequency swing of frequency modulated signals including in combination a source of frequency modulated signals, a cathode ray oscillograph having pairs of deflecting elements, a reference carrier frequency source, an electron discharge tube having relatively high anode resistance and a substantially pure inductive anode load circuit, means for mixing said signals and said carrier to derive currents of frequency corresponding to the instantaneous frequency difference between said signals and said carrier, means for applying said currents to the control electrode of said tube, means for applying the voltage developed across said tube anode load circuit to one pair of deflecting elements of said oscillograph, and means for applying the frequency modulating component of said frequency modulated signals to the other pair of deflecting elements of said oscillograph.

2. Apparatus for observing the peak frequency swing of frequency modulated signals including in combination a source of frequency modulated signals, a cathode ray oscillograph having pairs of deflecting elements, a reference carrier frequency source, an electron discharge tube having relatively high anode resistance and a substantially pure inductive anode load circuit, means for mixing said signals and said carrier to derive currents of frequency corresponding to the instantaneous frequency difference between said signals and said carrier, means for applying said currents to the control electrode of said tube, means for applying the voltage developed across said tube anode load circuit to one pair of said deflecting elements, and means for applying the frequency modulating component of said frequency modulated signals in desired phase relation to said voltage to the other pair of said deflecting elements.

3. Apparatus for observing the peak frequency swing of frequency modulated signals including in combination a source of said signals, a reference carrier frequency source, means for mixing said signals and said carrier, a first amplifier for the modulation component of said mixed signals higher in frequency than the carrier, a second amplifier for the modulation component of said mixed signals lower in frequency than the carrier, a substantially purely reactive load circuit connected to the output circuit of each of said amplifiers, an indicator connected to each of said load circuits, means for deriving square wave voltages as a function of the modulating component of said signals, and means for varying the gain of said amplifiers by said square wave voltages.

4. Apparatus for observing the peak frequency swing of frequency modulated signals including in combination a source of said signals, a reference carrier frequency source, at least one electron discharge tube having relatively high anode resistance and a substantially purely inductive anode load circuit means, an indicator connected to said load circuit means, means for mixing said signals and said carrier to derive currents of frequency corresponding to the instantaneous frequency difference between said signals and said carrier, means for applying said currents to the control electrode of said tube, means for applying the voltage derived across said inductive load circuit means to said indicator as a function of the frequency modulating component of said signals.

RENE A. BRADEN.